June 24, 1930.  R. R. BISHTON  1,767,572
RESILIENT WHEEL
Filed May 11, 1929   2 Sheets-Sheet 1

INVENTOR
R. R. Bishton
By Watson E. Coleman
ATTORNEY

June 24, 1930.  R. R. BISHTON  1,767,572
RESILIENT WHEEL
Filed May 11, 1929  2 Sheets-Sheet 2
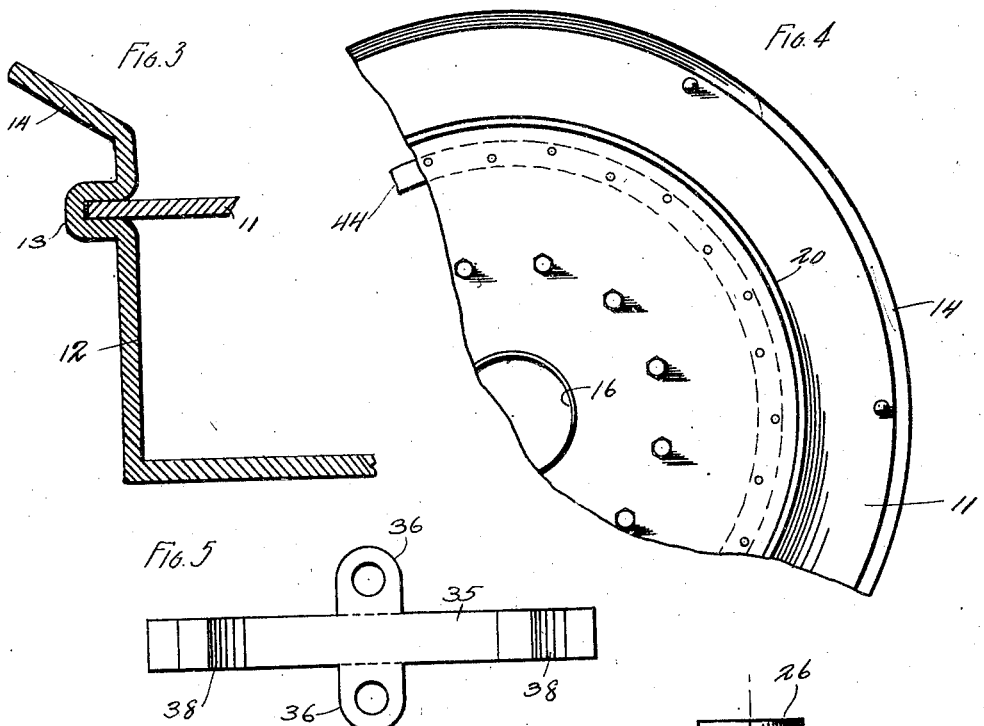
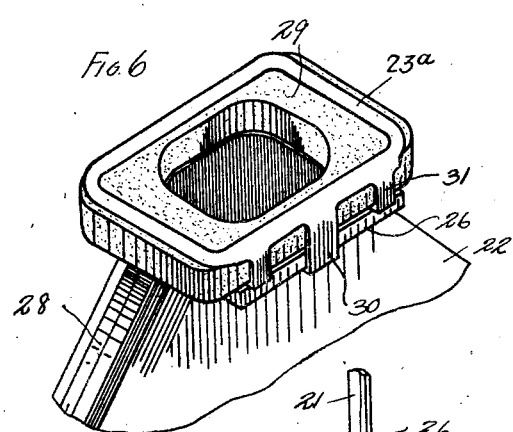
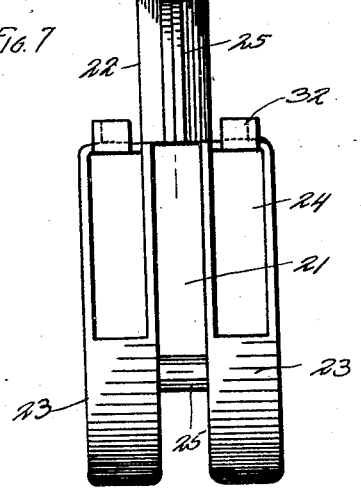
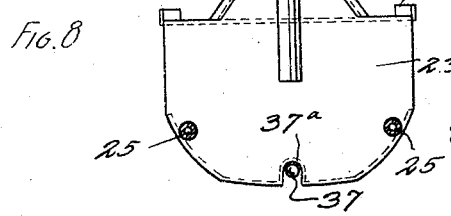
Inventor
R. R. Bishton
By Watson E. Coleman
Attorney Patented June 24, 1930

1,767,572

UNITED STATES PATENT OFFICE

ROBERT R. BISHTON, OF HERKIMER, NEW YORK

RESILIENT WHEEL

Application filed May 11, 1929. Serial No. 362,428.

This invention relates to improvements in resilient wheels for automobile or airplane use and particularly to improvements in the construction illustrated, described and claimed in my prior application for patent, Serial No. 234,843, filed November 21, 1927, and allowed on November 13, 1928.

The general object of the present invention is to improve upon the details of construction illustrated in my prior application before referred to and particularly to provide means whereby the spokes may be lubricated where they pass into the sockets of rockers which form the engaging means between the rim of the wheel and the spokes, to provide a double rocker having rocking elements spaced from each other so as to fit over and on each side of a limiting strip, and to provide space between the two rockers in which the spoke may operate, to provide improved means for limiting longitudinal motion of the rockers with relation to the spokes and to so construct the parts that they may be more readily manufactured and more readily assembled.

My invention is illustrated in the accompanying drawings, wherein:—

Figure 3 is a fragmentary sectional view of the wheel casing;

Figure 4 is a fragmentary elevation of the inside face of the wheel;

Figure 5 is a plan view of the socket guide and stop;

Figure 6 is a fragmentary perspective view of the inner end of one of the sockets or rockers showing the spoke lubricating means;

Figure 7 is a front elevation of one of the rockers and spoke receiving sockets;

Figure 8 is a sectional view through the rocker on the line 8—8 of Figure 7 but on a smaller scale and showing the spoke in elevation.

Figure 1:
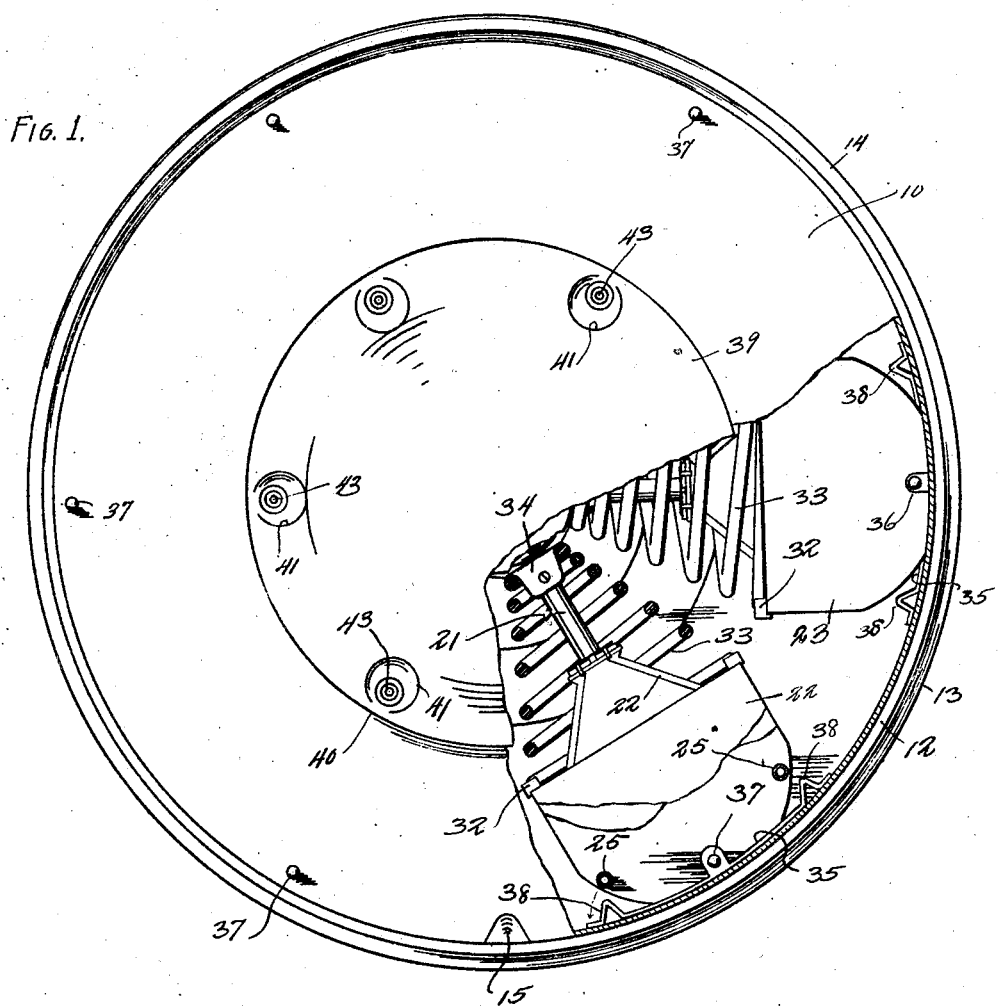
Figure 1 is a side elevation of a resilient wheel constructed in accordance with my invention, the outer casing being broken away, one of the rockers being partly in section and one of the springs being in section.

It will be seen that the casing of the wheel embodies two light sheet metal annular sections designated 10 and 11. The section 11 is annular in form and constitutes the inner section of the wheel casing.

The section 10 is laterally flanged or extended at the rim of the wheel as at 12 and formed to provide a circumferential recess or crimp as shown particularly in Figure 3 designated 13 which receives the rim of the section 11. Beyond this crimp 13, the sheet metal section 10 is outwardly and laterally extended as at 14, to form a tire rim retaining flange. At one point in the periphery of the wheel, there is formed a tapered groove 15 (see Figure 1) to provide clearance for the valve stem of a pneumatic tire. Both sections 10 and 11 are formed to provide a large central aperture to permit the proper operation of the wheel in an obvious manner.

The hub 16 is preferably of metal and may be constructed in any suitable manner and is screw-threaded for the reception of a hub cap 17. The inner end of the hub is flanged as at 18 to receive against it the brake disk 19 which is flanged at 20 as usual. The hub carries upon it a plurality of radial spokes 21. These spokes extend outward and each into the throat or mouth of a rocker designated generally 21.

Figure 2:
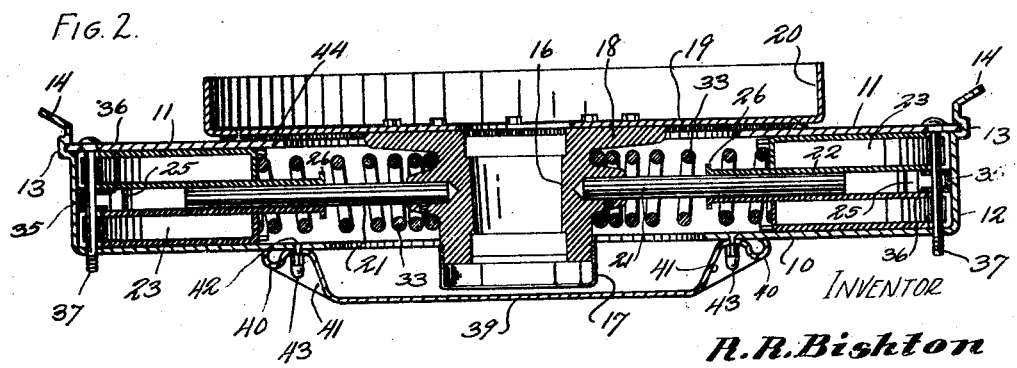
Figure 2 is a diametrical section through the construction shown in Figure 1.

As shown in Figure 8, each rocker has a substantially triangular inner member 22 which may be considered to be a socket into which the corresponding spoke 21 extends. Carried on the inner end of this member 22 in spaced relation to each other are the two rockers 23. These rockers are generally speaking rounded upon their outer faces so as to bear against the rim flange 12 of the casing member 10 as shown in Figures 1 and 2. The rockers 23 are preferably hollow but cut away as at 24.

Extending across the rockers are the spacing sleeves 25 which space the rockers from each other and also constitute stops as will hereinafter appear. The socket member 22 and the rockers 23 are made preferably of two light sheet metal stampings instead of being cast and the two stampings each constitute one-half of the socket and of a rocker. These are welded or riveted along the neck of the spoke chamber or socket, that is, along the junction of the flanges 28 (see Figures 6 and 7). At the mouth of the socket or spoke chamber 22, a flange 26 is formed apertured for the passage of the corresponding spoke. Resting upon this flange is a pad 29 of felt or other absorbent material adapted to retain lubricant. This felt pad is held in place upon the flange 26 by means of a clip formed to provide a frame 23ª fitting around the margins of the pad, this frame being formed with two laterally disposed ears 30 which are bent to embrace the flange 26 as shown in Figure 6 and the frame also having the four ears 31, each of which is bent around the pad so that these ears 31 hold the frame 23ª to the pad while the ears 30 hold the frame and pad to the flange 26.

The inner face of each rocker 23 is formed with inward extending ears 32 and disposed around each spoke 21 and extending over the triangular socket or neck 23 on each rocker is a transversely flattened coiled compression spring 33, this spring being generally conical in form and having its outer or larger end disposed to seat within the ears 32 while its inner or smaller end bears against the boss 34 carried upon the inner end of the spoke 21 and formed with a circumferential seat for the reception of said spring.

Thus it will be seen that these springs 33 urge the rockers outward away from the hub and into engagement with the rim. Disposed within the rim at intervals are the rocker guides 35, one of which is shown in Figure 5. Each guide is in the form of a narrow strip of metal sufficiently narrow to be received between the rockers 23. The middle of this strip is provided with the ears 36 adapted to be turned at right angles to the strip and to receive a bolt or pin 37 which passes through suitable apertures in the plates 10 and 11 and through apertures in the ears 36. The two rockers 23 are each cut away at 37ª to rock over this pin 37. Adjacent the ends of the rocker guide 35 there are formed the projecting somewhat triangular abutments or lugs 38 which coact with the transversely extending pins 25 to limit longitudinal movement of the rockers in either direction.

I have illustrated a dust cap 39 as extending over the hub cap 17 and the outer end of the hub, which dust cap is circular in form and provided with a bead 40 along its margin and inward of this bead with recesses 41, the bottoms of which are perforated to receive the stud bolts 42 with which the cap nuts 43 engage. Preferably an annular strip 44 of textile fabric or some strong material capable of resisting wear is secured to the head 19 of the brake drum and wheel casing. This strip 44 fills the space between the drum and the casing plate 11 and prevents dust or water from entering the large central opening in the casing plate 11.

While I have illustrated the plate 11 as being flat, it will be understood that under some circumstances it might be cupped outward toward the middle of the axle.

The operation of this wheel is substantially the same as the wheel which is illustrated and described in my prior application for patent. Under the weight of a vehicle applied to the hub 16 or under severe impact, the springs 21 yield and permit the wheel rim to move toward the hub, compressing the lowermost spring. The downward movement of the spokes on each side of the vertical spoke causes the rockers 23 to rock inward so that the lateral spokes not only are forced into the rockers against the action of the springs 33 but the rockers take an angular position with relation to the spokes. The socket and spokes above the hub, of course, act in a like manner except that the spokes are withdrawn from the sockets of the rockers in the same proportion as they are forced into the rocker sockets of those rockers disposed below a horizontal plane cut in the hub, the springs being extended instead of compressed.

As the wheel revolves, each spoke is forced into or withdrawn partially from its corresponding socket and rocker and each rocker is oscillated to accommodate this movement.

It will be noted that I have illustrated the rounded face of each rocker as being composed of a series of relatively flattened portions instead of absolutely circular so that a slight resistance is offered to the rocking motion. I do not wish to be limited to this, however as it is obvious that the inner face of each rocker may be a true circle.

It will be seen that with this construction the rockers are held from any lateral movement by engagement on each side of the guide 35. This will permit the lateral plates 10 and 11 being disposed out of frictional engagement with the rockers and thus permit an easier action of the wheel without the necessity of excessive lubrication and without undue friction.

The pins 37, of course, prevent any tendency of the outer casing to creep with relation to the inner structure while the abutments 38 limit the longitudinal movement of each rocker in either direction, when the rocker is out of engagement with the pins 37. Means, easily renewable, are provided for lubricating the spokes and at the same time permitting them to rock freely within the respective socket members 22.

It will be seen that the outer casing plates are held together by the crimp 13 which engages the plate 11 and are also held together by the bolts 37. Of course, it will be understood that broadly speaking I may omit the shell which encloses the rockers, the springs and the spokes, and thus I do not wish to be limited to the use of this enclosing shell except as stated in the appended claims. Neither do I wish to be limited to the details of construction except as stated in the appended claims.

I claim:—

1. A resilient wheel including a hub, spokes radiating therefrom, a rim, rockers having rocking and sliding engagement with the spokes, compression springs disposed between the rockers and the hub and surrounding the spokes, guiding means mounted on and extending longitudinally of the rim with which the rockers have engagement at all times, said guiding means preventing lateral movement of the rocker with relation to the rim and preventing bodily circumferential movement of the rocker on the rim.

2. A resilient wheel including a hub, spokes radiating therefrom, a rim, rockers having rocking and sliding engagement with the spokes, compression springs disposed between the rockers and the hub and surrounding the spokes, guiding means mounted on and extending longitudinally of the rim with which the rockers have engagement at all times, said guiding means preventing lateral movement of the rocker with relation to the rim and preventing bodily circumferential movement of the rocker on the rim, said guiding means acting to limit the rocking movement of the rockers on the rim.

3. A resilient wheel including a hub, spokes radiating therefrom, a rim, rockers bearing against the rim, each rocker having sliding and oscillating engagement with a spoke, compression springs disposed between the rockers and the hub and urging the rockers into engagement with the rim, a guiding member for each rocker attached to the rim and against which the rocker bears and on which the rocker rocks, said guiding member carrying a transversely extending pin and the rocker being recessed to embrace said pin whereby to prevent the rocker from shifting circumferentially of the rim and relative thereto.

4. A resilient wheel including a hub, spokes radiating therefrom, a rim, rockers bearing against the rim, each rocker having sliding and oscillating engagement with a spoke, compression springs disposed between the rockers and the hub and urging the rockers into engagement with the rim, a guiding member for each rocker attached to the rim and against which the rocker bears and on which the rocker rocks, said guiding member carrying a transversely extending pin and the rocker being recessed to embrace said pin whereby to prevent the rocker from shifting circumferentially of the rim and relative thereto, each of said members and the corresponding rocker interfitting circumferentially to prevent lateral movement of the rocker with relation to said member.

5. A resilient wheel including a hub, spokes radiating therefrom, a rim, rockers bearing against the rim, each rocker having sliding and rocking engagement with the corresponding spoke in the plane of the wheel, each rocker having spaced apart parallel rocker portions, springs urging said rockers toward the wheel rim, and rocker guides mounted upon the inner face of the rim, and each coacting with one of said rockers, each rocker guide having at its middle an inwardly projecting portion and each rocker portion being recessed to receive said upwardly projecting portion, the guide extending between the spaced apart rocker portions and preventing lateral movement of the rockers upon the wheel rim.

6. A resilient wheel including a hub, spokes radiating therefrom, a rim, rockers bearing against the rim, each rocker having sliding and rocking engagement with the corresponding spoke in the plane of the wheel, each rocker having spaced apart parallel rocker portions, springs urging said rockers toward the wheel rim, and rocker guides mounted upon the inner face of the rim, and each coacting with one of said rockers, each rocker guide having at its middle an inwardly projecting portion and each rocker portion being recessed to receive said upwardly projecting portion, the guide extending between the spaced apart rocker portions and preventing lateral movement of the rockers upon the wheel rim, members connecting the rocker portions and constituting stops and each guide being formed with inwardly projecting abutments coacting with said stops to limit longitudinal movement of the corresponding rocker.

7. A resilient wheel including a hub, spokes radiating therefrom, a rim, rockers bearing against the wheel rim and having sliding and rocking engagement each with its corresponding spoke in the plane of said wheel, each rocker being formed with two spaced apart parallel rocker portions, springs surrounding the spokes and urging the rockers toward the wheel rim and guide strips mounted upon the inner face of the wheel rim and fitting between said rocker portions of the rockers and preventing lateral movement of the rockers.

8. A resilient wheel including a hub, spokes radiating therefrom, a rim, rockers bearing against the wheel rim and having sliding and rocking engagement each with its corresponding spoke in the plane of said wheel, each rocker being formed with two spaced apart parallel rocker portions, springs surrounding the spokes and urging the rockers toward the wheel rim and guide strips mounted upon the inner face of the wheel rim and fitting between said rocker portions of the rockers and preventing lateral movement of the rockers, each guide having inwardly projecting ears and a pin passing through said ears and projecting laterally beyond them, each rocker portion being cut away at its middle to accommodate said pin, the ends of the guides being formed with inwardly extending abutments and members extending across the space between the rocker portions and carried thereby and adapted to engage said abutments to limit longitudinal motion of the rockers.

9. A resilient wheel including a hub, spokes radiating therefrom, a rim, rockers having oscillative bearing against the wheel rim, each rocker being formed with an outwardly and circumferentially flared receiving chamber or socket having an aperture through which the spoke projects, a yieldable member of fibrous material carried upon the inner end of each spoke receiving chamber or socket and fitting the spoke and a compression spring surrounding each spoke and operatively bearing at one end against the hub and at the other end against the corresponding rocker.

10. A resilient wheel including a hub, spokes radiating therefrom, a rim, rockers bearing against the wheel rim, each rocker being formed with an outwardly and circumferentially flared receiving chamber or socket having an aperture through which the spoke projects, a yieldable member of fibrous lubricant absorbent material carried upon the inner end of each spoke receiving chamber or socket and fitting the spoke and springs interposed between the hub and the rocker.

11. In a resilient wheel, a rocker bearing against the inside of the rim of the wheel, a spoke extending from the hub of the wheel toward the rocker, the rocker being formed with a spoke receiving chamber or socket, the chamber being circumferentially flared, the disk inner end of the chamber being flanged, a disk of fibrous lubricant absorbent material disposed upon said flange, and a resilient clip extending over the inner face of the disk and having portions extending around said flange and a compression spring surrounding each spoke and operatively bearing at one end against the hub and at the other end against the rocker.

12. In a resilient wheel, a rocker bearing against the inside of the rim of the wheel and having oscillation thereon, a spoke extending from the hub of the wheel toward the rocker, the rocker being formed with a spoke receiving chamber or socket, the chamber being circumferentially flared, the inner end of the chamber being flanged, a disk of fibrous lubricant absorbent material disposed upon said flange, and a resilient clip extending over the inner face of the disk and having portions extending around the margin of the disk and bent over against said flange and a compression spring surrounding the spoke operatively bearing at one end against the hub and at the other end against the rocker.

13. In a wheel of the class described having a hub and a wheel rim, spokes secured to and radially extending from the hub into socket forming members arranged on the inner periphery of the wheel rim, cushioning means interposed between the hub and the socket forming members, said socket forming members suitably recessed and of such configuration to enable the socket to rock or roll laterally in either direction on the inner periphery of the wheel rim.

14. In a wheel of the class described having a hub and a wheel rim, spokes secured to and extending radially from the hub, rockers mounted upon the wheel rim for rocking movement in the plane of the wheel rim, the rockers having sockets into which the spokes extend, the sockets being flared outward in the direction of the plane of the wheel whereby to permit the rockers to rock laterally in either direction on the inner periphery of and in the same plane as the wheel rim, and cushioning means interposed between the hub, the sockets and the rocker.

15. In a wheel of the class described having a hub and a wheel rim, spokes secured to and extending radially from the hub, rockers mounted upon the wheel rim for rocking movement in the plane of the wheel rim, the rockers having sockets into which the spokes extend, the sockets being flared outward in the direction of the plane of the wheel whereby to permit the rockers to rock laterally in either direction on the inner periphery of the wheel rim, the wheel rim being provided with transverse elements upon its inner face, the periphery of each rocker being transversely recessed to receive said element, and cushioning means interposed between the hub and the inner faces of the rockers.

16. A wheel of the class described, having a hub and wheel rim, spokes extending radially from the hub, rockers arranged on the inner periphery of the wheel rim, each rocker being hollow and having an opening at its inner end to receive the spoke, the interior of the rocker being sufficiently large as to permit the rocker to rock relative to the spoke and upon the wheel rim and a spiral spring extending around each spoke operatively bearing at one end against the hub of the wheel and at the other end bearing against the corresponding rocker.

17. A wheel of the class described, having a hub and a wheel rim, spokes extending radially from the hub, rockers mounted upon the wheel rim, one for each spoke, each rocker having a rounded outer face bearing against the wheel rim and being formed with an outwardly and laterally flaring socket into which the spoke projects, the socket permitting the rocker to rock upon the wheel rim with relation to the spokes, and a spring for each rocker urging the rocker outward on the spoke and toward the wheel rim.

In testimony whereof I hereunto affix my signature.

ROBERT R. BISHTON.